United States Patent
Adams et al.

(10) Patent No.: US 6,327,269 B1
(45) Date of Patent: Dec. 4, 2001

(54) RATE CONTROLLER

(75) Inventors: John Leonard Adams, Felixstowe; Avril Joy Smith, Oxford, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,323

(22) PCT Filed: Jul. 9, 1996

(86) PCT No.: PCT/GB96/01643

§ 371 Date: Feb. 23, 1998

§ 102(e) Date: Feb. 23, 1998

(87) PCT Pub. No.: WO97/03189

PCT Pub. Date: Jan. 30, 1997

(30) Foreign Application Priority Data

Jul. 12, 1995 (GB) .................................................. 9514206

(51) Int. Cl.[7] ...................................................... H04J 3/16
(52) U.S. Cl. .............................................................. 370/468
(58) Field of Search ................................... 370/465, 468, 370/235, 236, 395, 397, 409, 389, 351, 352, 252, 254, 238, 232, 251, 253

(56) References Cited

U.S. PATENT DOCUMENTS

| 5,179,556 | 1/1993 | Turner . |
| 5,231,631 | 7/1993 | Buhrke et al. . |
| 5,258,979 | 11/1993 | Ooomuro et al. . |

(List continued on next page.)

FOREIGN PATENT DOCUMENTS

| A0 413 488 | 2/1991 | (EP) . |
| 0487235 | 5/1991 | (EP) . |
| 0448073 | 9/1991 | (EP) . |
| 0452223 A2 | 10/1991 | (EP) . |
| 0468802 | 1/1992 | (EP) . |
| 0522391 | 1/1993 | (EP) . |
| A0 535 860 | 4/1993 | (EP) . |
| A0 603 099 | 6/1994 | (EP) . |

OTHER PUBLICATIONS

A. Romanov and S. Floyd, "The Dynamics of TCP Traffic Over ATM Networks", Proc. Sigcomm 94, UCL London, Aug. 1994, pp. 79–98.

IEEE Infocom '93 The Conference on Computer Communiatoins, vol. 3, Mar. 28, 1993, San Francisco, US, paes 1288–1297, Bolla et al; "An Integrated Dynamic Resource Allocation for ATM Networks".

Supercomm/ICC '94, vol. 3, May 1, 1994, New Orleans, US, pp. 1605–1615, Atai et al, "A Rate–Based Feedback Traffic Cntroller for ATM Networks".

IEEE Infocom '93 The Conference on Computer Communications, vol. 3, Mar. 28, 1992, San Francisco, US, pp. 1330–1336, Bernabei et al, "Analysis of On–Off Source Shaping for ATM Multiplexing".

(List continued on next page.)

Primary Examiner—Dang Ton
(74) Attorney, Agent, or Firm—Nixon & Vanderhye P.C.

(57) ABSTRACT

A network for ATM signals includes source end systems SES1, SES3 connected by a permanent virtual connection PVC1 through switch SW1 . . . SWN. Dynamic bandwidth controllers DBC1, DBC2 operate as virtual source/virtual destinations. The individual switches, such as switch SW2 have associated rate controllers RC1 which determine the available bandwidth for the signal path PVC1. Dynamic bandwidth controller DBC1 interrogates the rate controller RC1, RC2 using resource management RM signals which cascade from switching node to switching node along the path in a forward direction and then in a backward direction. The DBC's communicate with the SES's using RM signals which may be of a different format to the RM signals which pass from switching node to switching node.

31 Claims, 3 Drawing Sheets-

U.S. PATENT DOCUMENTS

| | | |
|---|---|---|
| 5,271,005 | 12/1993 | Takase et al. . |
| 5,280,470 | 1/1994 | Buhrke et al. . |
| 5,289,462 | 2/1994 | Ahmadi et al. . |
| 5,291,481 | 3/1994 | Doshi et al. . |
| 5,313,454 | 5/1994 | Bustini et al. . |
| 5,315,586 | 5/1994 | Charvillat . |
| 5,367,517 * | 11/1994 | Cidon et al. ............... 370/431 |
| 5,377,327 | 12/1994 | Jain et al. . |
| 5,448,559 | 9/1995 | Hayter et al. . |
| 5,463,620 | 10/1995 | Sriram . |
| 5,497,375 | 3/1996 | Hiuchyj et al. . |
| 5,528,592 | 6/1996 | Schibler et al. . |
| 5,570,355 * | 10/1996 | Dail et al. ............... 370/352 |
| 5,570,360 | 10/1996 | Klausmeier et al. . |
| 5,577,035 | 11/1996 | Hayter et al. . |
| 5,604,742 * | 2/1997 | Colmant et al. ............ 370/396 |
| 5,633,859 | 5/1997 | Jain et al. . |
| 5,633,861 | 5/1997 | Hanson et al. . |
| 5,636,212 | 6/1997 | Ikeda . |
| 5,677,906 * | 10/1997 | Hayter et al. ............... 370/235 |
| 5,696,764 | 12/1997 | Soumiya et al. . |
| 5,898,670 | 4/1999 | Hoebeke et al. . |
| 5,940,370 | 8/1999 | Curtis et al. . |
| 5,982,771 * | 11/1999 | Caldara et al. ............ 370/389 |
| 6,011,804 * | 1/2000 | Bertin et al. ............... 370/468 |

OTHER PUBLICATIONS

Computer Networks and ISDN Sysems, vol. 26, No. 1, Sep. 1993, Amsterdam, NL, pp. 43–59, Shiram, "Methodologies for Bandwidth Allocation, Transmission Scheduling, and Congestion Avoidance in Broadbend ATM Networks".

Supercomm/ICC '94, May 1, 1994, New Orleans, US, pp. 733–737, Yazid et al, "Fast Reservation Protocol and Statistical Multiplexing a Comparative Study".

IEEE Global Telecommunications '93, Nov. 29, 1993, Houston, US, pp. 719–723, Newman, "Backman Explicit Congestion Notification for ATM Local Area Networks".

ITU–T Recommendation 1.371: Traffic and Congestion Control in B–ISDN:, Mar. 1993.

Crocetti et al, IEEE Infocom '91, vol. 3, Apr. 7, 1991, Bal Harbor, pp. 1145–1150 "Bandwidth Advertising for MAN/ATM Connectionliess Internetting".

Saito et al, Transactions of the Institute of Electronics, Information and Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

Caho et al, International Switching Symposium, vol. 1, Oct. 25 & 30, 1991, Yokohama, pp. 1229–1233, "A General Architecture for Link–Layer Congestion Control in ATM Networks".

* cited by examiner

RATE CONTROLLER

RELATED APPLICATIONS

This application is related to the copending commonly assigned applications noted below:

U.S. Ser. No. 08/619,653, filed Mar. 22, 1996, "BROADBAND SWITCHING NETWORK"; U.S. Ser. No. 80/913,270, filed May 4, 1998, "BROADBAND SWITCHING SYSTEM"; U.S. Ser. No. 08/999,749, filed Sep. 10, 1997, "BROADBAND SWITCHING SYSTEM"; and U.S. Ser. No. 08/983,268, filed Sep. 10, 1997, "BROADBAND SWITCHING NETWORK".

FIELD OF THE INVENTION

This invention relates to a network for signals of different bandwidth, and a rate controller for use in allocating bandwidth to a signal path through the network.

BACKGROUND

It is known to link multi-user systems over large distances through leased telephone lines. For example, a workstation may be linked over a long distance to a host computer through a leased line in a telephone system. The line passes through a number of switching nodes and its bandwidth may be shared by a number of different users connected to the same host or different source end systems. The data is typically transmitted between the work station and host in a bi-directional manner, in bursts. The transmissions may be supported by asynchronous mode transmission mode (ATM) equipment. The bandwidth available to a particular transmission is initially determined by the signal source performing a routine in which the transmitted data rate is progressively increased in a test routine. The system at the destination sends back to the source a signal when the received signals become corrupted due to the data rate becoming too high, and in this way the data transmission bandwidth is set to the maximum value that the path can handle. Another bandwidth allocation technique is disclosed in EP-A-0 603 099.

When a number of signal sources and destinations share the same line, an unfair allocation of bandwidth can occur in which the shortest path tends to grab the most bandwidth because the acknowledgement signal returned during test routine occurs more quickly over a short path, so that the shorter path can acquire bandwidth more quickly. As a result, long paths tend to operate at a slower data rate than short paths. Another disadvantage is that the customer has to lease the telephone lines on a continuous basis, whereas the actual utilisation of the line varies greatly with time. For example, at night, a low utilisation rate may be achieved so that the customer has to pay for time when the line is not actually being used.

Recently, proposals have been made to integrate leased lines into a telephone network system so that the available bit rate (ABR) of the leased line can be used for other purposes during periods of low data transmission so as to permit data users to be charged on the basis of time that data is actually transmitted rather than on a flat rate leasing basis.

One proposal is to use the so-called virtual source/destination (VS/VD) configuration in which a source end system (SES) is connected to a public telephone network through a node which acts as a so-called virtual source (VS) that feeds data from the SES into the network for onward transmission to a destination end system (DES) for example a host computer or another workstation. The DES is connected to the public network through a so-called virtual destination (VD) that receives signals from the virtual source. Also, the DES can communicate back to the SES so that the virtual source and virtual destination operate bi-directionally and each comprise a VS/VD. In PCT GB 95/00502 and EP 94301673.3 a VS/VD system is described in which the bandwidth allocated to a bi-directional ATM transmission path through a public telephone network is controlled by means of a dynamic bandwidth controller (DBC). The DBC acts as a VS/VD and a connection admission control function (CAC) reviews the available bandwidth of switching nodes disposed along the transmission path so that the DBC can optimally allocate bandwidth to the path depending on operational conditions in the public network.

The DBC communicates with the SES using a specially configured form of digital ATM signal known as a resource management (RM) signal, which is used to instruct the SES to transmit at a data rate corresponding to a particular bandwidth determined by the DBC to be acceptable for the network. Also, the DBC reviews data signals received from the SES to police the data transmission rate to ensure that it falls within the acceptable bandwidth. The DBC also buffers signals received from the SES and provides certain data re-shaping and rate control functions.

The use of VS/VD architecture overcomes the contention difficulties associated with prior networks but has the disadvantage that a CAC function needs to be overlaid for all the switches of the public telephone network in order to provide the DBC with bandwidth control information. However, in practice, the network provider may wish to introduce VS/VD facilities progressively through the network and the introduction of a CAC and a DBC function as described in PCT GB 95/00502 and EP 94301673.3 would be initially expensive as it implies that all of the switches of the system would need to be replaced by switches that can handle ABR formatted signals.

SUMMARY OF THE INVENTION

With a view to overcoming the problem, the present invention provides a network for signals of different bandwidth, comprising: an input for signals from a source end system; an output for the signals; a plurality of switching nodes for selectively providing a signal communication path between the input and the output; a dynamic bandwidth controller for controlling the bandwidth allocated to the path for signals from the source end system; and a plurality of rate controllers each associated with a respective one of the switching nodes for determining the bandwidth available for the path through the node; the dynamic bandwidth controller being operative to interrogate the rate controllers such as to determine the bandwidth available for the path and provide a signal to instruct the source end system of the available bandwidth.

By the use of a plurality of individual rate controllers, each associated with a respective switching node, the use of a separate CAC is avoided, which permits the switching nodes of an existing network progressively to be changed to handle ABR signals so that the ABR service can be progressively introduced through the network.

Preferably the rate controllers each include means for transmitting a signal representative of the bandwidth available for the path through its associated node, to the rate controller associated with a next switching node along the path, and bandwidth determining means for determining the bandwidth available for the path through the node as a function of the lowermost of the actual available bandwidth and the bandwidth signalled to be available through the preceding node.

The invention also includes a rate controller for use with one of a plurality of switching nodes connected in a network comprising an input for signals from a source end system, an output for the signals, a signal communication path between the input and the output through the plurality of switching nodes, and a dynamic bandwidth controller for controlling the bandwidth allocated to the path for signals from the source end system, the rate controller comprising: means for transmitting a signal representative of the bandwidth available for the path through the node, to the rate controller associated with a next switching node along the path, and bandwidth determining means for determining the bandwidth available for the path through the node as a function of the lowermost of the actual available bandwidth and the bandwidth signalled to be available through the preceding node.

The invention also extends to a method of allocating bandwidth to a signal path through a network for signals of different bandwidth that comprises an input for signals from a source end system, an output for the signals, a plurality of switching nodes for selectively providing a signal communication path between the input and the output, the method comprising: controlling the bandwidth allocated to the path for signals from the source end system; and successively, for each node in the path, transmitting a signal representative of the bandwidth available for the path through the node to the next switching node along the path, and determining the bandwidth available for the path through the node as a function of the lowermost of the actual available bandwidth and the bandwidth signalled to be available through the preceding node.

Currently, international standards for an ABR service are being developed. Reference is directed to ITU Draft Revised Recommendation I.371, Traffic Control and Congestion Control in B-ISDN. 1995 and Ed. Shirish Sathaye, ATM Forum Traffic Management Specification, Version 4.0, 1995. The proposed standards include predetermined formats for the RM signals that are used to communicate between the VS/VD and the SES/DES. However, the network provider may wish to use proprietary RM signals within the network itself.

In accordance with the present invention there is provided a network for signals of different bandwidth, comprising: an input for signals from a source end system; an output for the signals; a plurality of switching nodes for selectively providing a signal communication path between the input and the output; means for producing network resource management signals as a function of bandwidth availability in the network; and a dynamic bandwidth controller responsive to the resource management signals for controlling the bandwidth allocated to the path for signals from the source end system; the dynamic bandwidth controller is configured to communicate with the source end system using resource management signals in a different format to the network resource management signals.

Thus, in accordance with the invention, RM cells according to an agreed standard can be used between the network and the SES or DES whereas proprietary RM signal formats can be used within the network itself.

BRIEF DESCRIPTION OF THE DRAWINGS

In order that the invention may be more fully understood an embodiment thereof will now be described by way of example with reference to the accompanying drawings in which.

DETAILED DESCRIPTION

Figure 1:
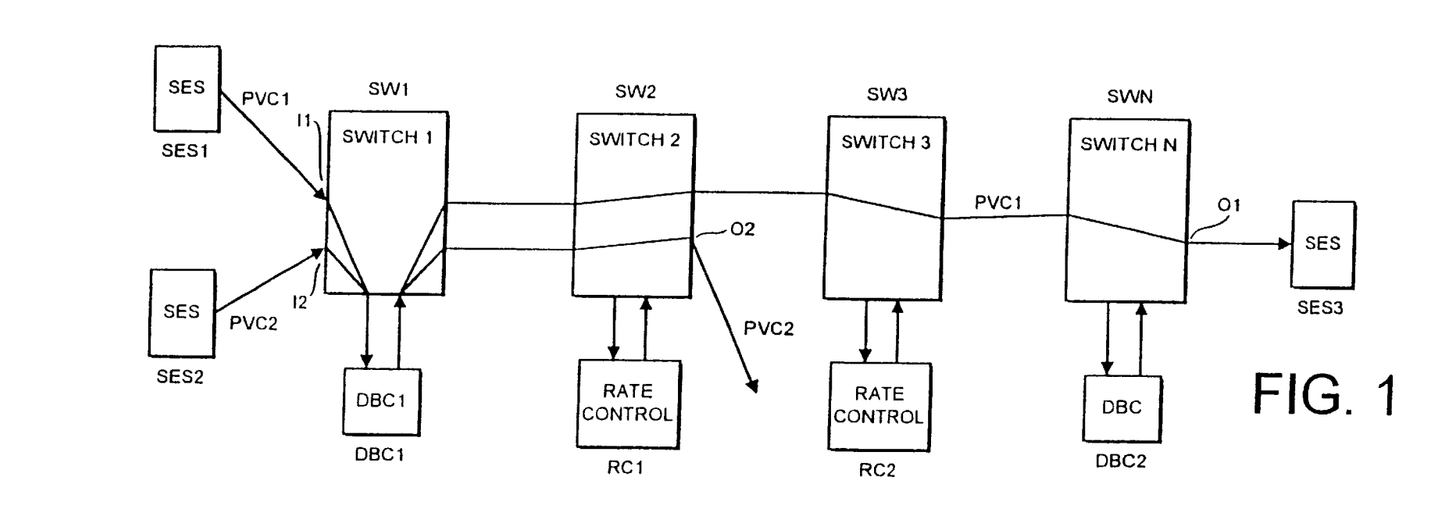
FIG. 1 is a block diagram of a network in accordance with the invention.

Referring to FIG. 1, source end systems SES1, SES2 send signals over permanent virtual connections (PVC1, PVC2) through a switch network which includes switches SW1–SW3, SWN. The switched network may comprise a public telephone network. As shown in FIG. 1, SES1 communicates with a source end system SES3 and the data flow between the source end systems is bi-directional. The source end systems transmit ATM signals and can operate at different data rates in order to control the bandwidth of the transmitted signals. As is well known in the art, the ATM signals comprise a bit sequence comprising a series of header bits followed by data bits.

Each of the switches SW1–SWN, comprise ATM switches which have a plurality of input ports and a plurality of output ports so that a plurality of switching paths can be set up through the switch under the control of conventional internal switching circuitry, which may be software controlled. ATM switches are well known per se and will not be described in detail herein. The switch has an overall bandwidth capacity which can be allocated between the various signal paths depending on the required bandwidth for each of them.

As will be explained in more detail hereinafter, the bandwidth allocation for the individual switches SW is performed by a respective rate controller. As shown in FIG. 1, switches SW2, SW3 have respective rate controllers RC1, RC2.

The system described herein utilises a virtual source and virtual destination VS/VD as described previously. Considering the path PVC1, switch SW1 in combination with a dynamic bandwidth controller DBC1 constitutes a VS in the network for signals from SES1. Similarly, switch SWN and an associated dynamic bandwidth controller DBC2 constitute a virtual destination VD for the signals from SW1 so that they can be communicated through output O1 to SES3. For signals travelling from SES3 to SES1, switch SWN and DBC2 constitute a virtual source with SW1/DBC1 constituting a virtual destination. Similarly, SW1/DBC1 constitute a VS for signals from SES2. The signal transmission and bandwidth allocation for signal path PVC1 will now be described in more detail. ATM signals from SES1 are directed through the switch SW1 to the dynamic bandwidth controller DBC1 which as previously explained acts as a VS/VD for SES1. The structure of DBC1 is as described in PCT GB 95/00502 and EP 943016173.3. It provides policing, buffering and re-shaping and rate control functions.

The DBC1 also acts as a VS for path PVC2 from SES2. The ATM signals from the sources SES1 are fed to input ports I1, I2 of the switch SW1 and are directed to DBC1 and hence to output ports of the switch.

Bandwidth control in the network is achieved by the use of resource management RM signals. These comprise ATM signals of the same general structure as the data being transmitted and include header bits which constitute routing data representative of the route of the path through the switches known in the art as the virtual path or connection index VPI/VCI. The RM signals also include control data which are used to control the bandwidth settings of various devices in the network, as will be explained in more detail hereinafter.

Figure 5:
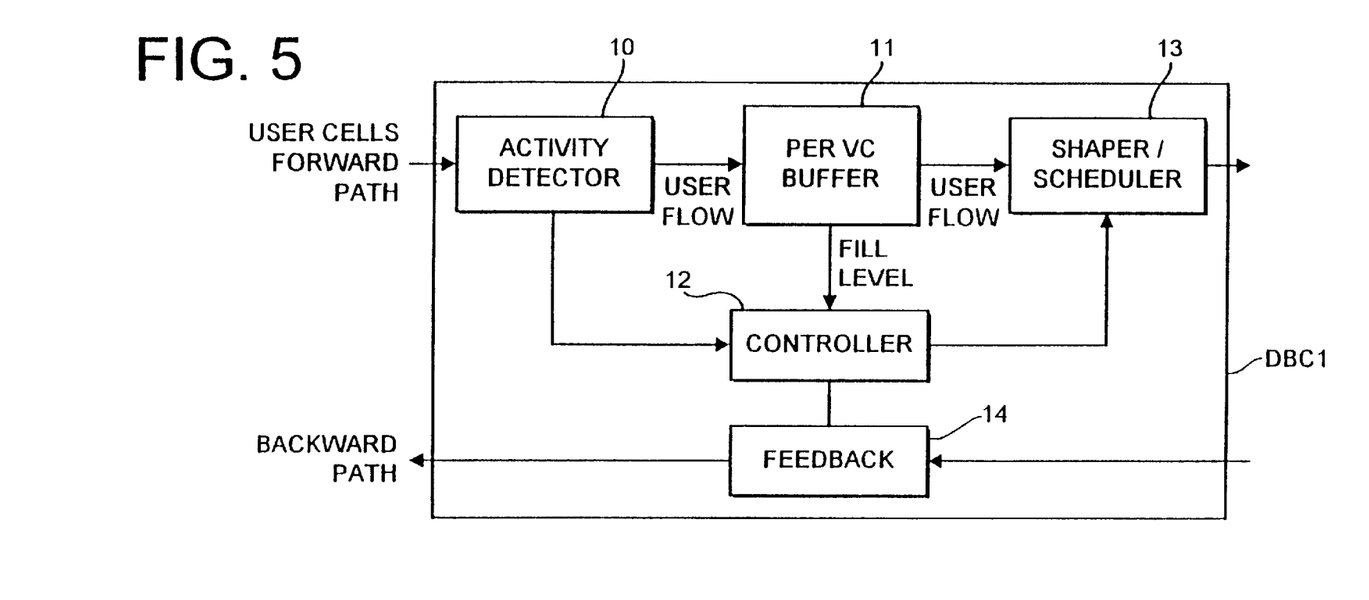
FIG. 5 is a more detailed block diagram of the dynamic bandwidth controller (DBC)

Referring to FIG. 5, the DBC1 includes an activity detector 10 which detects when ATM signals are being transmitted by the source end system SES1 or SES2, and a buffer 11 which includes a plurality of buffer circuits to receive ATM signals received at inputs I1, I2 to the switch SW1 respectively. A signal indicative of the fill level of the buffers is fed to a controller 12, which, as explained in PCT GB 95/00502 allocates bandwidth to the PVC's 1, 2. Signals from the buffer 11 are fed to a shaper/scheduler circuit 13 and, under the control of controller 12, are fed to an appropriate output port of the switch SW1 dependent upon the routing information in the header bits of the ATM signal.

Figure 6:
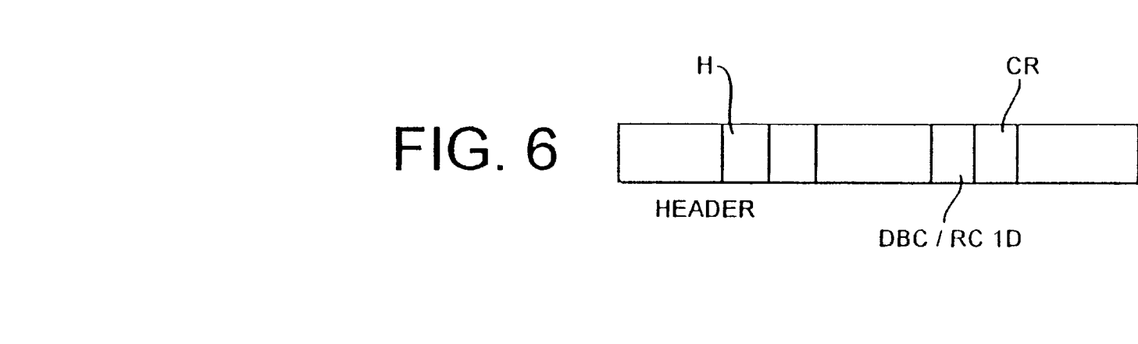
FIG. 6 is a schematic diagram of a RM cell.

Also, the controller 12 and shaper/scheduler 13 can be used to transmit RM signals along the various PVC's. A typical example of the structure of a RM signal used in this embodiment is shown in FIG. 6 and comprises a series of header bits H which includes the VPI/VCI which constitutes routing information that corresponds to the routing information of the ATM data signals so that the RM signals can be routed along the same path as the ATM data signals. Additionally, the RM signals include data bits ID indicating the DBC or RC which has generated the RM signals. Also, data bits CR define the cell rate or bandwidth available at the switch for the signal path PVC at which the RM signal was generated. Considering now path PVC1 in more detail, DBC1 generates an RM signal that indicates the bandwidth available for ATM signals passing through switch SW1, and the resulting RM signal is transmitted over control path 1–2 shown in FIG. 2 to switch SW2. Referring again to FIG. 5, DBC1 is arranged to receive RM signals fed back from the switch SW2 and the RM signals are received by feedback circuits 14 which, in turn feed RM signals to SES1 in order to control its operation.

The functional relationship between switch SW2 and its associated rate controller RC1 will now be described with reference to FIGS. 2 and 3. ATM data signals passing along PVC1 from SES1 through switch SW1 are fed to an input port switch SW2. The header bits of the ATM signals, which include routing information are, in a conventional manner compared with a routing table and as a result, the ATM switch directs the ATM data signals to an appropriate output port of switch SW2 so as to be routed on to the next switch along the path i.e. switch SW3.

However, for RM signals received from DBC1, the switch SW2 is programmed to divert the RM signals to the rate controller RC1. As will be described in more detail hereinafter, the rate controller RC1 is configured to review, in response to the RM signal from DBC1, the bandwidth available to signals on path PVC1 through switch SW2. The rate controller then compares this bandwidth with the bandwidth or cell rate CR indicated by the RM signal from DBC1 and chooses whichever is the lower. It will be appreciated that the lower value constitutes the maximum bandwidth available on the section of path PVC1 between the input port to switch SW1 and the output port of switch SW2.

Figure 2:
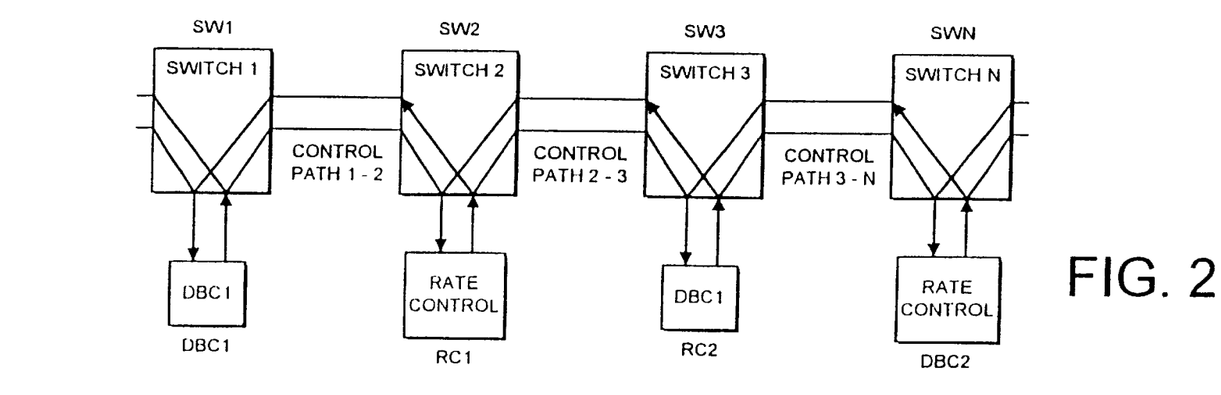
FIG. 2 is a block diagram showing in more detail the signal path PVC1 of FIG. 1.
Figure 3:
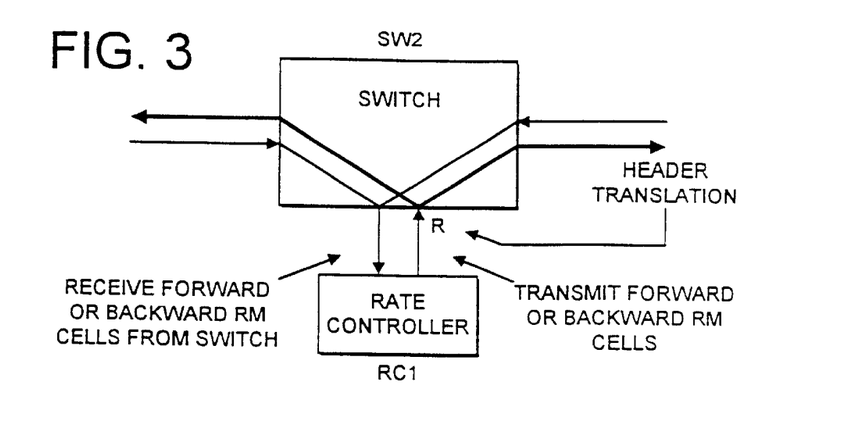
FIG. 3 illustrates in more detail the signal paths between one of the switches shown in FIG. 2 and its associated rate controller.

The rate controller RC1 then generates its own RM signal with header bits corresponding to route information for the next section of the path PVC1, namely control path 2–3 shown in FIG. 2. The RM signal is received by switch SW3 and associated rate controller RC2 which performs a control function in a similar way to switch SW2 and RC1. The process is repeated for further switches and rate controlling along the path PVC1 until an end switch SWN is reached.

As shown in FIG. 1, the end switch SWN has an associated dynamic bandwidth controller DBC2 which, as previously explained, operates both to provide DBC functions and rate control functions in a similar way to the rate controllers RC. Upon receipt of the RM signal from the preceding switch SW, namely switch SW3 as shown in FIG. 2, the switch SWN routes the RM signal to DBC2. The controller of DBC2 chooses the lowermost value of the available bandwidth for switch SWN and the value of the bandwidth indicated by the bit CR in the RM signal from RC2. It will be appreciated that the lowermost value is representative of the maximum bandwidth available along the entire path PVC1 since, for each switching node, it is necessary to consider the lowermost bandwidth, which will act as a restriction for the entire path.

DBC2 is configured to transmit a RM signal backwardly along the path PVC1 to the switch SW3 and associated rate controller RC2 which then operates to allocate bandwidth to path PVC1 at switch SW3 according to the path bandwidth signal generated by DBC2, which is indicated by the cell rate CR of the RM signal transmitted by DBC2 to RC2.

Rate controller RC2 then itself generates a RM signal which is transmitted back to rate controller RC1 and has a CR bit corresponding to the value of the path bandwidth signal generated by DBC2. The rate controller RC1 then sets the available bandwidth for PVC1 through SW2 according to the value of the path bandwidth signal. RC1 then in a similar manner, passes the path bandwidth signal back to DBC1, which allocates bandwidth to PVC1 through switch SW1 according to the path bandwidth signal.

Thus, all of the switches SW1–SWN in path PVC1 are set to the maximum available bandwidth for the entire path PVC1. DBC1 then generates a RM signal which is transmitted to SES1, instructing the source to transmit data at a rate corresponding to this maximum available bandwidth for path PVC1.

The dynamic bandwidth controller DBC1 then performs a policing function for the signals transmitted on PVC1. If the data rate exceeds the permitted rate set by the RM signal from DBC1, for more than a predetermined period, cells will be discarded by the DBC for the data transmission along path PVC1 in order to prevent SES1 unallowably capturing more than its allocated bandwidth.

Figure 4:
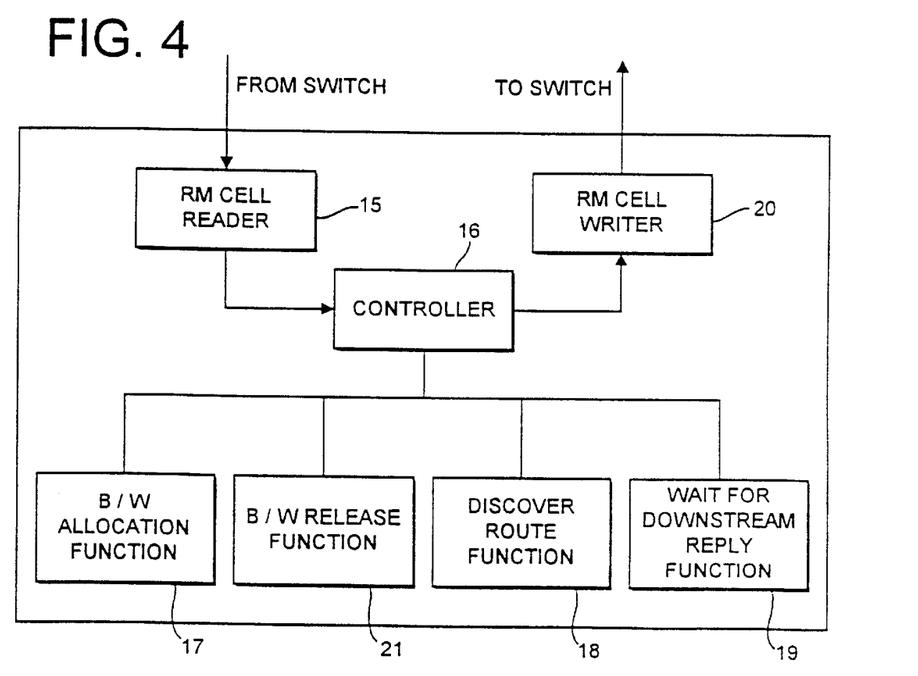
FIG. 4 is a detailed block diagram of the rate controller.

The structure of the rate controller RC1 will now be described in more detail with reference to FIG. 4, it being understood that all of the rate controllers RC can have an identical architecture. The rate controller RC1 comprises a RM cell reader 15 which reads data from RM cells fed thereto from the corresponding switch SW2. The cell reader 15 reads the header bits from the RM cell in order to determine routing information, reads the ID information to determine which RC/DBC has generated the RM cell, and also the CR bits in order to determine the bandwidth information. This data is fed to a controller 16, which is typically microprocessor based, with an associated operating memory, and performs a number of different functions as now will be explained. The first function comprises bandwidth allocation as shown by function block 17. The controllers 16 reviews the bandwidth allocated to the various PVCs (and other channels) which are routed through the switch SW2, and also has information concerning the maximum available bandwidth through the switch. The maximum available bandwidth which can be allocated to a particular PVC can be determined by an algorithm known per se, for example the so-called Robin Hood algorithm which is described in EP 94301673.3 which "robs" bandwidth from a path which is "rich" in bandwidth and gives it to a "poor" path according to a predetermined function.

The controller 16 also performs a route discovery function 18 in which the route is identified from the VPI/VCI header bits of the incoming RM signal. A RM cell writer 20 is used to generate RM cells for transmission back to the switch SW with header bits corresponding to the relevant route as determined by function 18, an ID cell corresponding to the identity of the rate controller and a CR cell which indicates the lowermost of the available bandwidth as indicated by function 17 and the bandwidth indicated by the incoming RM cell read by cell reader 15. The resulting RM cell is thus transmitted back to the switch SW1 for onward transmission forwardly along the path to switch SW3.

As previously explained, the switch SWN acts an end switching node and DBC2 transmits back along the path a RM signal which constitutes a path bandwidth signal representative of the bandwidth available for the entire path, so that all of the rate controllers RC can allocate bandwidth for the path at their respective switches according to the path bandwidth signal. To this end, the controller 16 shown in FIG. 4 includes a wait function 19 during which it waits for the reception of a RM signal transmitted backwardly along the path from rate controller RC2, which contains a CR cell corresponding to the path bandwidth signal derived from DBC2. Upon receipt of this RM signal by reader 15, the controller 16 operates to set the bandwidth for path PVC1, using function 17, so as to correspond to the path bandwidth signal.

When the ATM data signals from SES1 go quiet, it is no longer necessary to maintain a bandwidth allocation for the path PVC1. In this situation, the dynamic bandwidth controller DBC1 transmits a RM signal to RC1 which contains a zero level CR bit. The processor has an associated bandwidth release function 21, so that the controller 16 releases the bandwidth allocated to path PVC1 and the bandwidth allocation function 17 can be re-run so as to distribute the bandwidth amongst other active paths. From the foregoing it will be appreciated that the rate controller RC1 responds to RM signals transmitted both forwardly and backwardly along the path PVC1. This enables the route function 18 shown in FIG. 4 to develop a map of the relevant input and output ports of switch SW1 for the respective PVCs. Thus, the memory of the controller 16 can be used to build up a collation between the input ports that receive RM signals from a particular path that are transmitted forwardly and a corresponding output which receives an RM signal from the next switching node along the path, from which RM signals are transmitted backwardly. This information can be correlated with the routing information of forwardly directed RM signals so that when an RM signal is received and a further RM signal is to be generated and transmitted forwardly by a particular rate controller, the rate controller can refer to the memory map that has been built up to determine which output port the RM signal should be directed to so that it is correctly forwarded to the next switching node on the path concerned.

Furthermore, the rate controller RC1 may use an internal RM signal protocol, which generates header bits according to a local standard. The header bits may be translated when the RM signal is fed to the switch by internal software associated with the switch itself, so as to convert the local protocol of the rate controller in to a common standard used between the switches SW1–SWN.

Also, the described network permits different RM signal protocols to be used in different parts of the network. For example, communication between the switches SW1 and SWN and the respective source end systems SES1, SES3 may be carried out with RM signals according to an internationally accepted standard, whereas the RM signals used between the switches SW1–SWN may be to a different standard preferred by the network operator. In this situation, DBC1 and DBC2 include translation means in order to recognise RM signals according to the international standard and then to generate RM signals for forward transmission within the network according to a separate network standard.

What is claimed is:

1. A network for signals of different bandwidths, said network comprising:

inputs for signals from a plurality of source end systems;

outputs for the signals;

a plurality of switching nodes for selectively providing signal communication paths between the respective inputs and outputs;

a plurality of said paths which pass through said nodes;

a dynamic bandwidth controller for dynamically controlling the bandwidth allocated to each of the paths for signals from the respective source end systems; and a plurality of rate controllers each associated with a respective one of the switching nodes for determining the bandwidth available for each of the paths through the node;

the dynamic bandwidth controller being operative, in response to data transmission activity at any of the plurality of source end systems, to interrogate the rate controllers so as to determine the bandwidth available for any given path and provide a signal to instruct the source end system corresponding to said given path of the available bandwidth.

2. A network as in claim 1 wherein the rate controllers each include:

means for transmitting a signal representative of the bandwidth available for the given path through its associated node, to the rate controller associated with a next switching node along the path, and bandwidth determining means for determining the bandwidth available for the path through the node as a function of the lowermost of the actual available bandwidth and the bandwidth signalled to be available through the preceding node.

3. A network as in claim 2 wherein said bandwidth determining means for each respective rate controller includes:

means for determining the actual bandwidth available for the given path through the associated switching node by reviewing the bandwidth allocated to the individual paths through the switching node and the total bandwidth capacity of the node and allocating bandwidth to the given path in accordance with a predetermined algorithm.

4. A network as in claim 3, wherein the algorithm is the Robin Hood algorithm.

5. A network as in claim 2, including:

control means associated with an end switching node in the path disposed towards the output, for transmitting back along the path towards the input a path bandwidth signal representative of the bandwidth available for the path through the end switching node as determined by the bandwidth determining means of the rate controller for said end switching node, all of the rate controllers associated with the switching nodes being operative to allocate bandwidth for the path at the respective associated node in dependence upon the path bandwidth signal.

6. A network as in claim 2 wherein the rate controllers each include means for transmitting resource management signals that include data representative of the bandwidth available at the node for the path as determined by the bandwidth determining means of the rate controller, and routing data representative of the route of the path through the switching nodes.

7. A network as in claim 6 wherein each of the switching nodes includes:

a plurality of signal input ports, a plurality of signal output ports, switching means for selectively connecting the input and output ports so as to feed data transmitted from a source end system along the path, means for selectively routing the resource management signals to the rate controller associated with the switching node, and routing means for selectively directing resource management signals from the rate controller to the output port for the path.

8. A network as in claim 7 wherein the rate controllers each include:

route memory means, and mapping means responsive to the routing data of the resource management signals for providing in the memory means data corresponding to a map of the relationship between the input and output ports of the switching node that are to be used for the path through the switching node.

9. A network as in claim 8 wherein:

the switching nodes are configured to transmit said resource management signals along the path both forwards to the next switching node along the path and backwards to the preceding node on the path, and the mapping means for each rate controller is operative to collate the input and output ports that receive the forward and backward resource management signals from adjacent switching nodes for the path.

10. A network as in claim 7, wherein the rate controller includes:

resource management signal reading means for reading resource management signals directed thereto from the associated switching node, and resource management signal writing means for writing a resource management signal with bandwidth data determined by the bandwidth determining means for transmission from an output port as determined by the routing means.

11. A network as in claim 10 wherein the path bandwidth signal comprises:

resource management signals transmitted from node to node backwardly along the path by the rate controllers, and each of the rate controllers along the path is configured to wait for said backwardly transmitted signal and allocate the bandwidth for the path through its associated switching node in accordance with the bandwidth data of said backwardly transmitted resource management signal.

12. A network as claimed in claim 2 wherein the rate controller includes:

path bandwidth memory means for storing the current bandwidth allocated to the individual paths through its associated switching node, and means for updating the path bandwidth memory means in response to a resource management signal providing an indication that one of the current bandwidths has changed.

13. A network as in claim 1 wherein the dynamic bandwidth controller is associated with one of the switching nodes, and includes:

means for determining the bandwidth available for the path through the associated node, and means for transmitting a signal representative of the available bandwidth through the associated node for the path, to the rate controller of the next switching node along the path so as to be processed by the bandwidth determining means thereof.

14. A network as in claim 13 wherein the bandwidth controller is configured to transmit said signal representative of the available bandwidth through the associated switching node to the next node along the path as a resource management signal, and to receive a backwardly transmitted resource management signal from the said next node corresponding to said path bandwidth signal.

15. A network as in claim 14 wherein the bandwidth controller is configured to respond to resource management signals from the source end systems representative of the operational bandwidth thereof.

16. A network as in claim 15 wherein the bandwidth controller is configured to respond to resource management signals from the source end systems in a different format to those transmitted between the switching nodes.

17. A network as in claim 12 wherein the bandwidth controller includes means responsive to the path bandwidth signal for transmitting an instruction to a source end system to transmit data with a bandwidth in accordance with a given value.

18. A network as in claim 17 wherein said given value corresponds to the value of the path bandwidth signal.

19. A network as in claim 17 wherein the instruction is transmitted as a resource management signal in a different format to those transmitted between the switching nodes.

20. A network as in claim 17, wherein the dynamic bandwidth controller includes means for determining whether the source end system transmits data at a rate within a bandwidth corresponding to said instruction.

21. A network as in claim 1 wherein the dynamic bandwidth controller includes:

buffer means for receiving signals transmitted thereto by the source end systems, and signal reshaping means for reshaping signals from the buffer means for onward transmission to the next switching node along the path.

22. A network as in claim 1 including:

a first said source end system connected to an input and a second said source end system connected to an output, whereby to permit data to be transmitted from the first to the second said system through the network.

23. A network as in claim 22 including a second dynamic bandwidth controller associated with one of the switching nodes for controlling data exchange between the network and the second source end system.

24. A network as in claim 22 wherein:

resource management signal communication between the source end systems and the dynamic bandwidth controllers is in a first format, and resource management signal communication between the switching nodes in the network is in a second different format.

25. A network as in claim 1 wherein the signals transmitted through the network comprise ATM signals.

26. A rate controller for use with one of a plurality of switching nodes connected in a network comprising input for signals from a plurality of source end systems, outputs for the signals, a plurality of signal communication paths between the respective inputs and outputs through the plurality of switching nodes, and a dynamic bandwidth controller for dynamically controlling the bandwidth allocated to each of the paths for signals from the respective source end systems, the rate controller comprising:

means for transmitting a signal representative of the bandwidth available to a given path through the node, to the rate controller associated with a next switching node along the path, bandwidth determining means for determining bandwidth available for the path through the node as a function of the lowermost of the actual available bandwidth and the bandwidth signaled to be available through the preceding node, means for determining the actual bandwidth available for the path through the associated switching node by reviewing the bandwidth allocated to the individual paths through the switching node and the total bandwidth capacity of the node, and allocating bandwidth to the path in accordance with a predetermined algorithm;

means for transmitting resource management signals that include data representative of the bandwidth available at the node for the path as determined by said bandwidth determining means, and routing data representative of the route of the path through the switching nodes;

route memory means, and mapping means responsive to the routing data of the resource management signals for providing in the memory means data corresponding to a map of the relationship between input and output ports of the switching node that are to be used for the path through the switching node.

27. A method of allocating bandwidth to a signal path through a network for signals of different bandwidth that comprises inputs for signals from a plurality of source end systems, outputs for the signals, and a plurality of switching nodes for selectively providing signal communication paths between the respective inputs and outputs, the method comprising:

dynamically controlling the bandwidth allocated to a given path for signals from a corresponding source end system, in response to data transmission activity at any of the plurality of source end systems, and successively, for each node in a given path, transmitting a signal representative of the bandwidth available for the path through the node to the next switching node along the path, and determining the bandwidth available for the path through the node as a function of the lowermost of the actual available bandwidth and the bandwidth signalled to be available through the preceding node.

28. A method as claimed in claim 27 including transmitting back along the path towards the input a path bandwidth signal representative of the bandwidth available for the path through a switching node at the end of the path, and allocating bandwidth for the path at all of the nodes in dependence upon the path bandwidth signal.

29. A communication network for carrying signals of different bandwidths, said network comprising:

one or more source systems communicating signals to one or more destination systems;

a plurality of switching nodes for selectively providing signal communication paths between the respective source and destination systems;

a plurality of said paths which pass through said nodes;

a dynamic bandwidth controller for dynamically controlling the bandwidth allocated to each of the paths for signals from the respective source and destination systems;

a plurality of rate controllers each associated with a respective one of the switching nodes for determining the bandwidth available for each of the paths through the switching node; and the dynamic bandwidth controller being operative, in response to data transmission activity at any of the source systems, to interrogate the rate controllers so as to determine the bandwidth available for any given path and provide a signal to instruct the source system corresponding to said given path of the available bandwidth, said signals to instruct the source system comprising resource management signals transmitted from node to node backwardly along the path by the rate controllers, and wherein each of the rate controllers along the path is configured to wait for said backwardly transmitted signal and allocate the bandwidth for the path through its associated switching node in accordance with the bandwidth data of said backwardly transmitted resource management signal.

30. A rate controller for use with one of a plurality of switching nodes connecting one or more source end system to one or more destination end systems, a plurality of signal communication paths between the respective source and destination end systems, and a dynamic bandwidth controller for dynamically controlling the bandwidth allocated to each of the paths for signals from the respective source end systems, the rate controller comprising:

means for transmitting a signal representative of the bandwidth available to a given path through a select switching node, to the rate controller associated with a next switching node along the path, bandwidth determining means for determining the bandwidth available for the path through the switching node as a function of the lowermost of the actual available bandwidth and the bandwidth signaled to be available through the preceding switching node from said select switching node, wherein signals for determining available bandwidth for a path comprise resource management signals transmitted from node to node backwardly along the path by rate controllers, and each of the rate controllers along the path is configured to wait for said backwardly transmitted signal and allocate the bandwidth for the path through its associated switching node in accordance with the bandwidth data of said backwardly transmitted resource management signal; and means for determining the actual bandwidth available for the path through the associated switching node by reviewing the bandwidth allocated to the individual paths through the switching node and the total bandwidth capacity of the switching node, and allocating bandwidth to the path in accordance with a predetermined algorithm.

31. A method of allocating bandwidth to a signal path among a plurality of signal paths in a communication network comprising a plurality of switching nodes connecting source end systems and destination end systems, the method comprising:

dynamically controlling bandwidth allocated to a given signal path for signals from a corresponding source end system, in response to data transmission activity at any of the source end systems;

successively, for each switching node in a given path, transmitting a signal representative of the bandwidth available for the signal path through the switching node to a next switching node along the signal path, said signal representative of the bandwidth available includes resource management signals transmitted from node to node backwardly along the signal path by rate controllers, and each of the rate controllers along the signal path is configured to wait for said backwardly transmitted signal and allocate the bandwidth for the signal path through its associated switching node in accordance with the bandwidth data of said backwardly transmitted resource management signal; and determining available bandwidth for the signal path through the switching node as a function of the lowermost of the actual bandwidth and bandwidth signaled to be available through a preceding switching node.

* * * * *